United States Patent [19]
Jolivet

[11] Patent Number: 5,568,336
[45] Date of Patent: Oct. 22, 1996

[54] MAGNETIC READING DEVICE WITH ALTERNATING MAGNETIC BIASING MEANS

[75] Inventor: Denis Jolivet, Les Clayes Sous Bois, France

[73] Assignee: Thomson-CSF, Puteaux, France

[21] Appl. No.: 402,392

[22] Filed: Mar. 10, 1995

Related U.S. Application Data

[63] Continuation of Ser. No. 123,068, Sep. 17, 1993, abandoned.

[30] Foreign Application Priority Data

Sep. 18, 1992 [FR] France ................... 92 11146

[51] Int. Cl.[6] ................... G11B 11/10; G11B 5/02
[52] U.S. Cl. ................... 360/114; 360/59; 369/13
[58] Field of Search ................... 360/110, 114, 360/59; 369/13

[56] References Cited

U.S. PATENT DOCUMENTS

| | | |
|---|---|---|
| 3,229,273 | 1/1966 | Baaba et al. . |
| 3,513,457 | 5/1970 | Nelsen . |
| 3,701,133 | 10/1972 | Smaller et al. ........... 360/114 |
| 4,618,901 | 10/1986 | Hatakeyama et al. ........... 360/114 |

FOREIGN PATENT DOCUMENTS

| | | |
|---|---|---|
| 0154307 | 9/1985 | European Pat. Off. . |
| 0421874 | 4/1991 | European Pat. Off. . |
| 2095550 | 2/1972 | France . |
| 926833 | 5/1963 | United Kingdom . |
| 9110234 | 7/1991 | WIPO ................... 360/114 |

OTHER PUBLICATIONS

Patent Abstracts of Japan, vol. 3, No. 41 (E–103), Apr. 10, 1979, JP-A-54 21315, Feb. 17, 1979.
Patent Abstracts Of Japan, vol. 11, No. 144 (P–574)(2591), May 12, 1987, JP-A-61 280013, Dec. 10, 1986.
Neues aus der Technik, No. 2, vol. 15, May 18, 1986, p. 7, "Magnetkopf".
Patent Abstracts Of Japan, vol. 10, No. 86 (P–443)(2143), Apr. 4, 1986, JP-A-60 223042, Nov. 7, 1985.
Patent Abstracts Of Japan, vol. 11, No. 233 (P–600) (2680), Jul. 30, 1987 & JP-A-62 46418, Feb. 28, 1987.
Patent Abstracts Of Japan, vol. 11, No. 103 (P–562)(2550), Apr. 2, 1987 & JP-61 253619, Nov. 11, 1986.
Patent Abstracts Of Japan, vol. 11, No. 45 (P–546)(2492), Feb. 10, 1987 & JP-A-61 214260, Sep. 24, 1986.
Patent Abstracts Of Japan, vol. 10, No. 86 (P–443)(2143), Apr. 4, 1986, JP-A-60 223043, Nov. 7, 1985.
IBM TDB "Optical Readout For Magnetic Memory", Barrekette et al., vol. 6, No. 4 Sep. 1963 pp. 145–146.
IBM TDB "Magneto–Optical Read–Out System", Albert et al., vol. 14 No. 7 Dec. 1971 p. 2160.

Primary Examiner—Stuart S. Levy
Assistant Examiner—William J. Klimowicz
Attorney, Agent, or Firm—Oblon, Spivak, McClelland, Maier & Neustadt, P.C.

[57] ABSTRACT

This magnetic medium reading device comprises means for the induction of an AC magnetic excitation field in the reading zone of the magnetic head. It can be applied notably to magneto-optical reading heads. Applications: reading of magnetic media (magnetic tapes and disks).

18 Claims, 3 Drawing Sheets

MAGNETIC READING DEVICE WITH ALTERNATING MAGNETIC BIASING MEANS

This application is a Continuation of application Ser. No. 08/123,068, filed on Sep. 17, 1993, now abandoned.

BACKGROUND OF THE INVENTION

1. Field of the Invention

The invention relates to a magnetic reading device and, notably, to a reading head for magnetic recording media. It can be applied preferably in a magnetic reader of computer peripherals or in professional video tape recorders.

More particularly, the invention can be applied to a Kerr effect type of magneto-optical reading head with a view to linearizing its operation.

In the general context of a system for the recording and reading of data on magnetic media, the reading sensor may be magneto-optical and may use the "Kerr" effect to read the data elements.

The magneto-optical Kerr effect is a property of certain materials used in the industry of magnetic sensors: a linearly polarized optical beam that gets reflected on the surface of a material possessing the Kerr effect has its direction of polarization rotated as a function of the magnetic flux present in the material, at the position of the reflection.

As shown in FIGS. 1a and 1b, a reading sensor working by Kerr effect is organized in two layers of magnetic material 1, 2 separated by a non-magnetic insulator 3: this structure is optimized to channel the magnetic flux coming from the information elements recorded on the medium as is shown in FIG. 1a.

In the zone 5 of the sensor, this sensor is in contact or almost in contact with a magnetic medium 4 to be read. A linearly polarized optical beam FI gets reflected on one of the magnetic layers of the head and the information elements are read by detection of the rotation of polarization (the Kerr effect) of the reflected beam FR.

This device is the object of the French patent application No. 89 17313. However, this device has the following drawbacks:

The Kerr effect is a surface effect, and to obtain high sensitivity of the Kerr sensor, the layers forming the magnetic circuit have to be as thin as possible;

In structures such as these, the magnetization is organized in "magnetic domains" that shift randomly as a function of the magnetic information elements read back from the magnetic medium. The noise due to these random reconfigurations reduces the signal-to-noise ratio and makes the signal unusable;

Furthermore, the magnetic layers always display magnetic anisotropy in the plane and a residual coercive field that takes the form of non-linearities in the signal that is read back.

One technique used to stabilize the domains of the magnetic layers in magneto-resistive sensors consists of the addition, to the head, of a magnetized layer which "anchors" the domains by its field.

This technique is aimed at overcoming these defects.

SUMMARY OF THE INVENTION

The invention therefore relates to a magnetic reading device comprising a reading head having at least one magnetic thin layer comprising a reading zone, wherein said device also comprises means for the induction of a magnetic excitation field superimposed in the reading zone.

The superimposed magnetic excitation field is preferably an alternating field.

In this device, the magneto-optical reading head is a device wherein the magneto-optical reading head is a magneto-optical head with Kerr effect comprising two layers of magnetic material separated by a gap layer made of non-magnetic material and comprising the reading zone designed to be located in a magnetic field to be detected, the reading light beam being polarized and being reflected by one of the magnetic layers, an analyzer of polarizations receiving the read beam and transmitting it to a photodetector.

BRIEF DESCRIPTION OF THE DRAWINGS

The various objects and features of the invention shall appear more clearly in the following description, given by way of an example, and from the appended figures, of which.

DETAILED DESCRIPTION OF THE INVENTION

The invention consists of a low-amplitude AC magnetic field generator positioned in the vicinity of the head: this device homogenizes the Kerr effect reading head from the magnetic viewpoint.

Figure 1A:
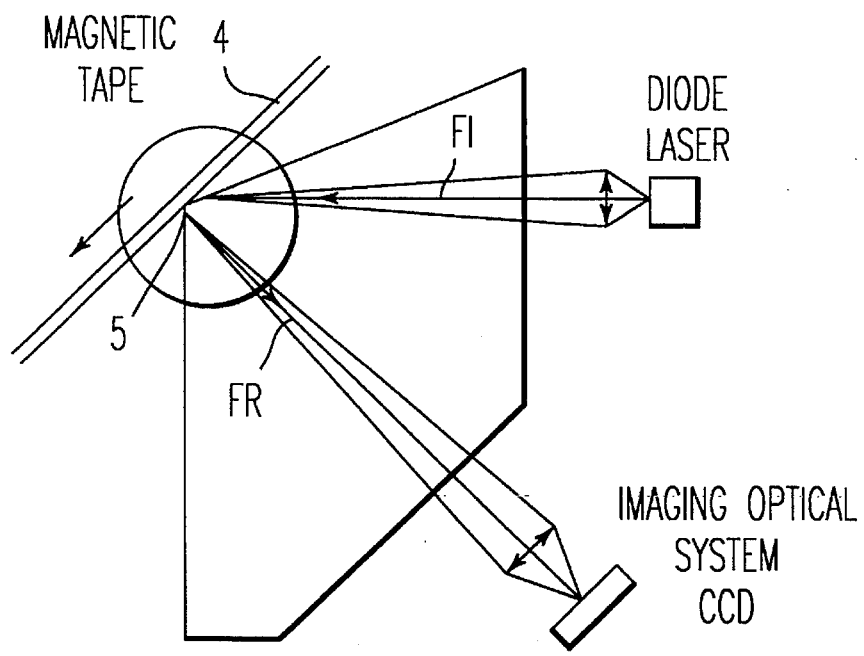
FIGS. 1a, 1b and 2 show a known type of magneto-optical device with Kerr effect.
Figure 1B:
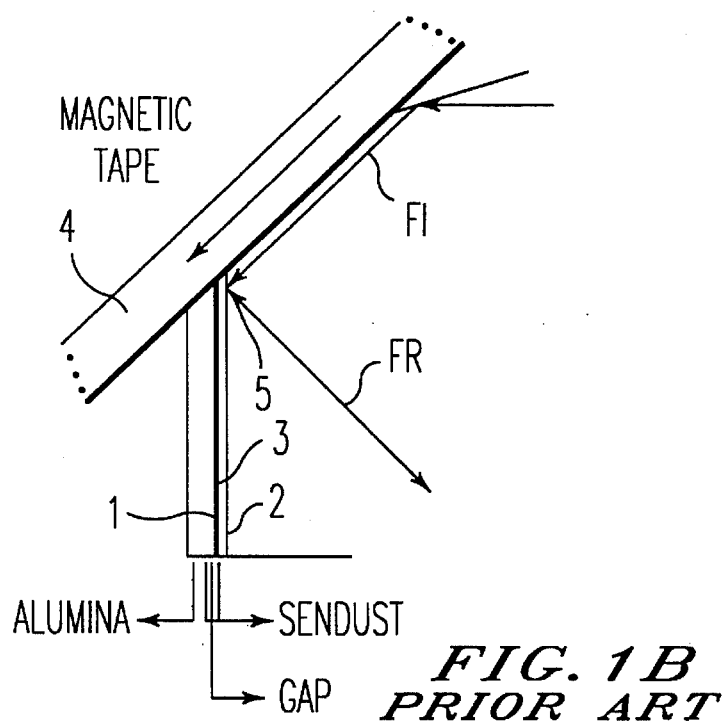
Figure 2:
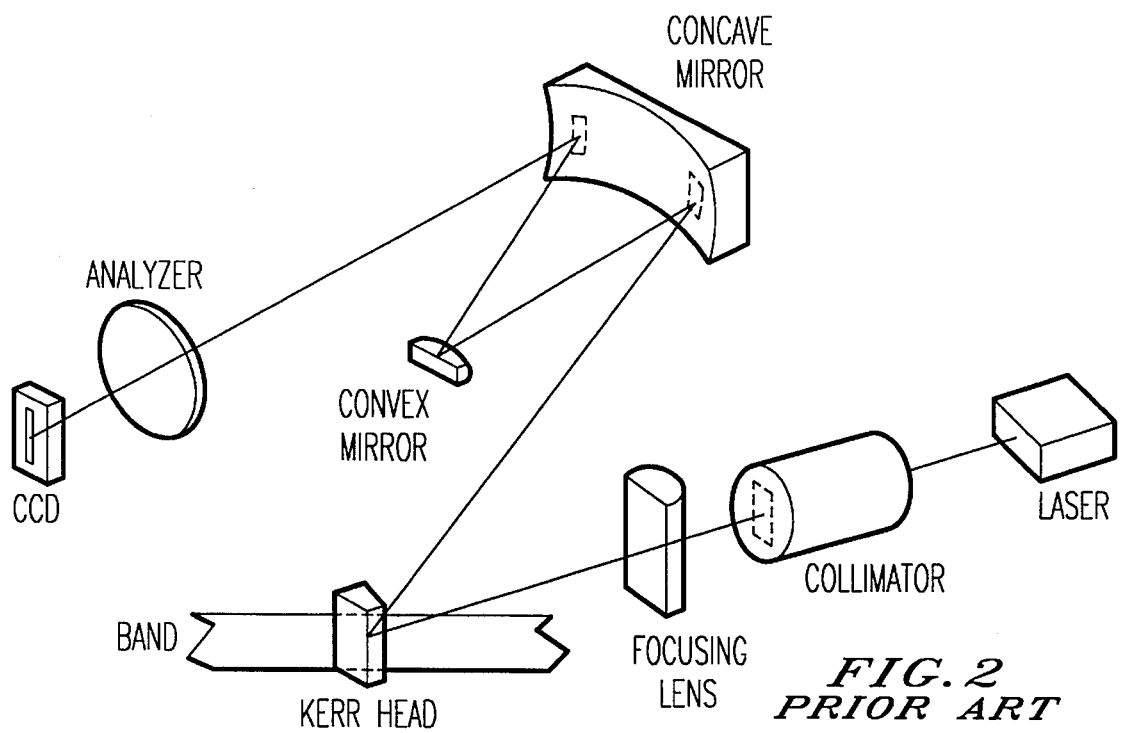
Figure 3:
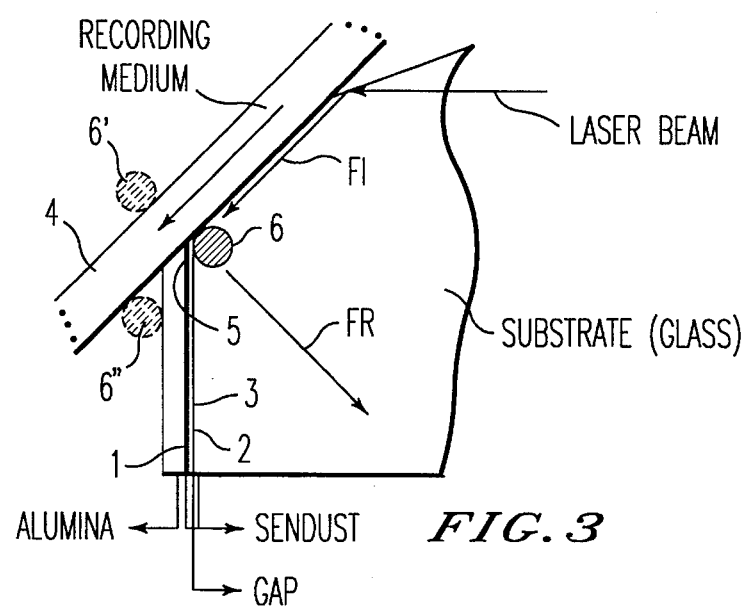
FIG. 3 shows a simplified view of an exemplary embodiment of the device of the invention.

In FIG. 3, this generator is represented by a device 6 inducing a superimposed AC magnetic field (magnetic polarization) in the zone 5 where the magnetic head is under the influence of a magnetic field to be detected. This device can take different forms: what is essential is that it must induce an almost uniform magnetic field throughout the zone 5. This is also necessary if the medium is a multiple-track medium and if the zone 5 enables the simultaneous reading of several recorded information elements.

In FIG. 3, this magnetic field induction device has been represented by device 6. However, this device may be placed in any other location so as to induce a magnetic field in the zone 5, for example the locations 6' or 6".

Figure 4:
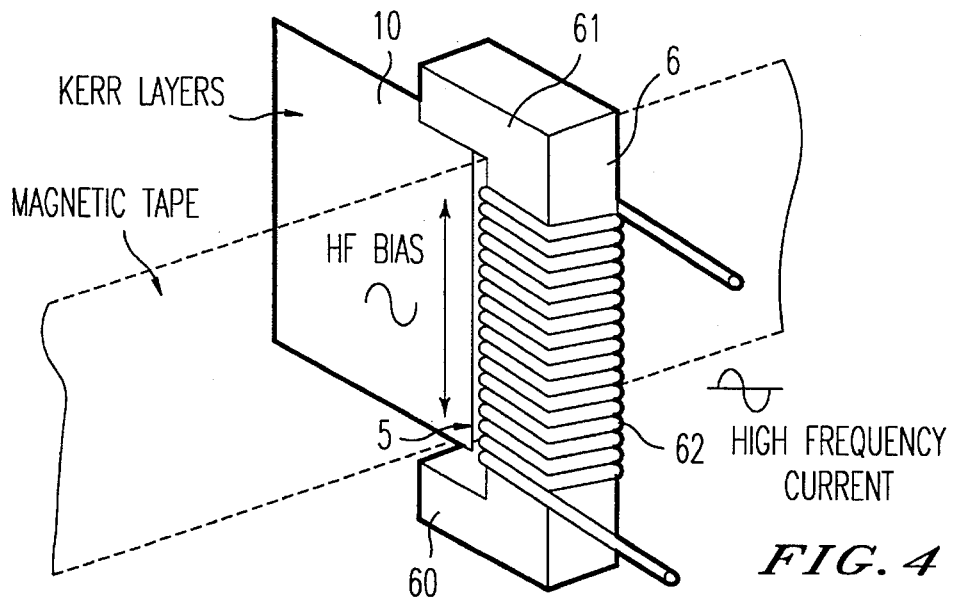
FIGS. 4 and 5 show detailed views of exemplary embodiments of the device of the invention.

FIG. 4 shows an exemplary embodiment applied to the reading of a magnetic tape. This device has the Kerr effect reading head 10 which itself corresponds to the elements 1, 2, 3 of FIG. 3. The light beam for the reading of the magnetic head has not been shown.

The reading head 10 is in contact (or almost in contact) with the magnetic medium to be read which moves past regularly during the reading stage.

A solenoid 62 equipped with a ferrite core 6, positioned in a straddling position on the reading head, generates an AC field in the layers. This field, which is made homogeneous throughout the active part of the sensor by the geometry of the ferrite, "agitates" the magnetic domains.

Without high frequency bias, the signal read from the tape is affected by the magnetic non-linearities of the layers and by the noise of reconfiguration of the domains described above.

In the presence of bias, the AC field applied by the solenoid to the head gives rise to a field that gets superimposed on the useful signal coming from the medium. Thus, the sensor delivers a "carrier" signal at the frequency of the AC field, and to this signal there is added the useful signal coming from the tape that is read back.

The frequency of this activation must be greater than the useful spectrum of the signal read back so that it can be eliminated by filtering. Since the noise of reconfiguration in domains and the non-linearities occur in synchronism with the bias, these phenomena are also rejected by filtering.

Figure 5:
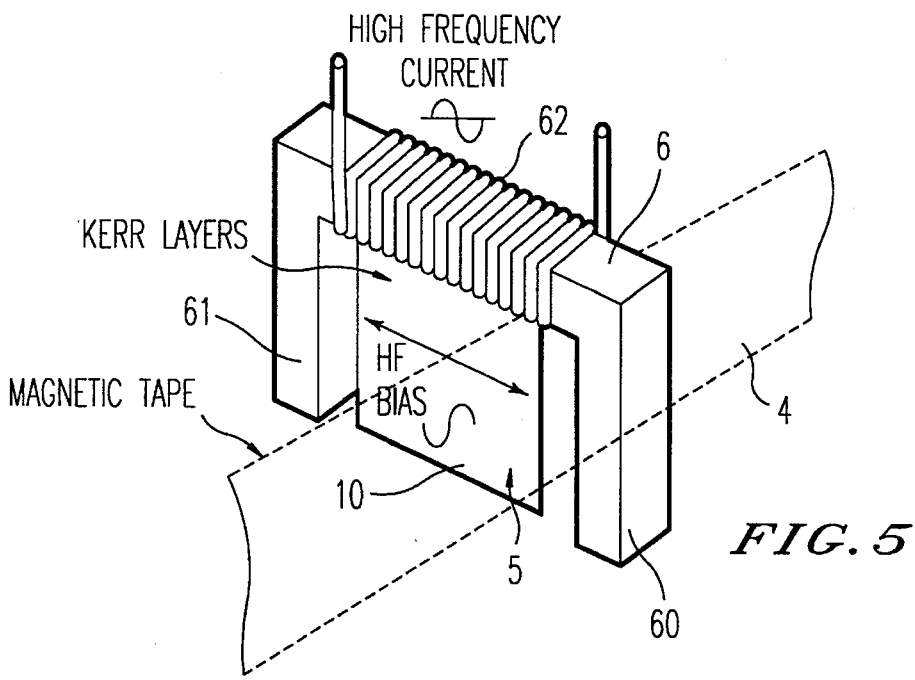

In FIG. 5, the zone 5 of the magnetic head 10 is in the vicinity of the magnetic tape 4 to be read. The AC magnetic field induction device has two poles 60, 61 placed in the vicinity of the magnetic head 10 in such a way that the flux induced by the coil 62 gets closed by the magnetic head and notably in such a way that the magnetic flux is induced in the zone 5.

In the case of a multiple-track magnetic tape, the active part of the magnetic head 10 is placed transversally to the direction of the tape and the zone 5 enables the simultaneous reading of several tracks. The poles 60, 61 are placed on the sides of the magnetic head transversally with respect to the magnetic tape. In this way, an AC magnetic field (for example, a high frequency field) is induced in the plane of the magnetic layers of the magnetic head, this being done in the zone 5 in parallel to the plane of the magnetic tape.

FIG. 5 shows a variant of an embodiment of the device of FIG. 4. The magnetic circuit 6 and the Kerr effect reading head 10 are located on one and the same side of the magnetic medium 4 to be read. What is essential is that the AC magnetic field should be applied in parallel to the plane of the magnetic layers of the reading head, and in the zone 5 subjected to the magnetic field to be read on the magnetic medium.

Figure 6:
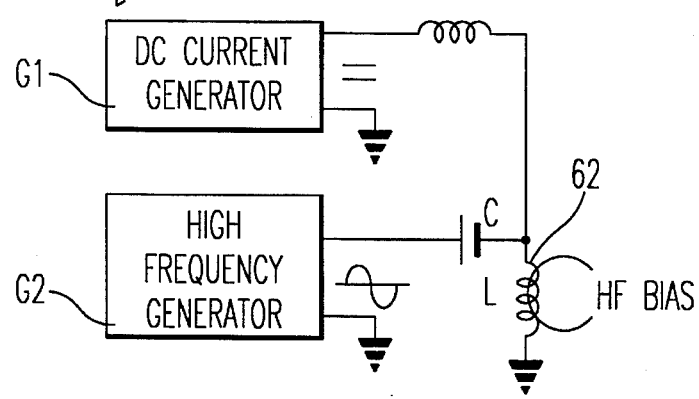
FIG. 6 shows an exemplary view of a supply circuit of the device of the invention.

Furthermore, the application of a low-amplitude DC magnetic field (DC magnetic polarization) makes it possible to optimize the efficiency of the high frequency polarization. The solenoid valve 62 furthermore fulfills this role of DC polarization. An electrical diagram shown in FIG. 6 illustrates this possibility by enabling the supply of the solenoid valve 62 by means of a DC current given by a high frequency generator G2.

Should the signal of the sensor be discreetly sampled, it is advantageous to place the frequency of the magnetic polarization at an even multiple of the sampling frequency. The filtering is then naturally carried out through the synchronism of the frequencies, without spectral aliasing. For example, the frequency of the magnetic polarization could range from 500 KHz to 1 MHz for a sampling frequency of 50 KHz.

The invention brings the following advantages:

The alternating polarization increases the signal-to-noise ratio of the magneto-optical sensor in the useful frequency band.

The high frequency polarization prompts an additional noise that is filtered in the following part of the reading system, and the useful signal is increased up to 6 decibels. Everything happens as if the alternating polarization were to act as a "magnetic fluidifier" which fosters the propagation of the field induced by the tape in the reading magnetic layer.

The gain in signal-to-noise ratio is 2 to 3 dB as a function of the frequency of the signal that is read back.

The square waveform for the magnetic polarization enables a better signal-to-noise ratio to be achieved than the sinusoidal waveform.

Through its role of a "magnetic fluidifier", the magnetic polarization promotes the propagation of the field in the layers, and the adjusting of the optical elements becomes less of an intricate task, and hence easier to achieve.

In the foregoing description, the invention was applied to a magneto-optical reading head using the Kerr effect. However, it can also be applied to any other reading head in which a light beam has its characteristics modified by the magnetic field. The essential object is to be provided for an additional magnetic field that has the role of stabilizing the magnetic layers.

Also, the invention can be applied to all types of magnetic heads in which there is a need to overcome instabilities or non-linearities of the head. Notably, it can be applied to all magnetic sensors constituted by thin layers such as magneto-resistive heads.

The technique presently used to stabilize the magnetic thin layers of these sensors consists of the addition, of a magnetized layer to the sensors that makes the layers become magnetic mono-domain layers. This DC field provides for a magnetic stability of the layers to the detriment of the sensitivity of the sensor.

The application of an AC field by an external coil or a coil integrated with the magnetic layers of the magneto-resistive sensors would have the same advantages for the amplitude of the signal and for the linearization of the working of the sensor.

What is claimed is:

1. A magneto-optical reading apparatus for reading magnetic encoded data from a recording medium comprising:

a light source for generating a light beam;

a reading head being translucent for allowing said light beam to pass therethrough and having a portion engaged with the recording medium;

a magnetic film having a first edge adjacent the portion of the reading head engaged with the recording medium, a second edge extending away from the first edge and a third edge extending away from the first edge, said second and third edges opposing each other;

a magnet having a first magnetic pole positioned adjacent the second edge of the magnetic film and adjacent a region of the magnetic film magnetically affected by the recording medium, and having a second magnetic pole adjacent the third edge of the magnetic film and adjacent a region of the magnetic film magnetically affected by the recording medium, forming an instantaneously uniform magnetic field in the reading head from the second edge of the magnetic film and the third edge of the magnetic film between the first and second magnetic poles;

alternating biasing means for alternating a magnitude of the instantaneously uniform magnetic field;

detecting means including a digital sampler for detecting the information transferred to the light beam at discrete sampling points at a sampling frequency;

means for filtering connected to the output of said detecting means for removing frequencies caused by the alternating biasing means, said frequencies being an even multiple of the sampling frequency; and wherein, when said recording medium passes the portion of the reading head engaged therewith and magnetizes the magnetic film according to magnetically encoded data, said light beam is passed through the reading head and reflected off the magnetic film in an area affected by the magnet and the magnetic film is magnetized by the recording medium, the magnet anchors magnetic domains in the magnetic film between the first and second magnetic poles to an instantaneously uniform magnetic field and the information transferred to the light beam is not affected by shifting magnetic domains.

2. The magneto-optical apparatus of claim 1, wherein the magnet and alternating biasing means further comprise:

a solenoid having a magnetic core and a solenoid wire connected to an alternating voltage source for creating a uniform alternating magnetic field between the first and second magnetic poles.

3. The magneto-optical apparatus of claim 2, wherein:

the magnet is c-shaped with the first and second magnetic poles at distant ends and is positioned around the recording medium opposite the reading head and the recording medium is sandwiched between the magnet and the reading head.

4. The magneto-optical apparatus according to claim 2, wherein the alternating magnetic field induced by the alternating biasing means is generated by an alternating current having a square waveform.

5. The magneto-optical apparatus according to claim 2, comprising means that enable information elements to be read at a determined frequency, the frequency of the alternating magnetic field being greater than the determined frequency.

6. The magneto-optical apparatus according to claim 5, wherein the frequency of the alternating magnetic field is an even multiple of said determined frequency.

7. The magneto-optical apparatus according to claim 1, wherein the magnetic film comprises two layers of magnetic material separated by a gap layer made of non-magnetic material and includes a reading zone designed to be located in a magnetic field to be detected, the light beam is reflected and polarized by one of the two layers according to the Kerr effect, and an analyzer of polarizations receiving the light beam transmits the light beam to a photodetector.

8. The magneto-optical apparatus according to claim 1, wherein the alternating biasing means further enables induction of a steady-state magnetic field superimposed on the alternating magnetic field.

9. The magneto-optical apparatus of claim 1, further comprising:

a DC biasing means coupled to the alternating biasing means for superimposing A DC magnetic field on the instanteously uniform magnetic field to optimize the efficiency of the instaneously uniform magnetic field.

10. A magneto-optical reading apparatus for reading magnetic encoded data from a recording medium comprising:

a light source for generating a light beam;

a reading head being translucent for allowing said light beam to pass therethrough and having a portion engaged with the recording medium;

a magnetic film having a first edge adjacent the portion of the reading head engaged with the recording medium and a second edge opposite the first edge;

a magnet having a first magnetic pole positioned adjacent the first edge sandwiching the recording medium with the magnetic film and having a second magnetic pole adjacent the second edge forming an instantaneously uniform magnetic field in the reading head from the first edge of the magnetic film to the second edge of the magnetic film between the first and second magnetic poles;

alternating biasing means for alternating a magnitude of the instantaneously uniform magnetic field;

detecting means including a digital sampler for detecting the information transferred to the light beam at discrete sampling points at a sampling frequency;

means for filtering connected to the output of said detecting means for removing frequencies caused by the alternating biasing means, said frequencies being an even multiple of the sampling frequency; and wherein, when said recording medium passes the portion of the reading head engaged therewith and magnetizes the magnetic film according to magnetically encoded data, said light beam is passed through the reading head and reflected off the magnetic film in an area affected by the magnet and the magnetic film is magnetized by the recording medium corresponding to the plurality of tracks, the magnet anchors magnetic domains in the magnetic film between the first and second magnetic poles to an instantaneously uniform magnetic field and the information transferred to the light beam is not affected by shifting magnetic domains.

11. The magneto-optical apparatus of claim 10, wherein the magnet and alternating biasing means further comprise:

a solenoid having a magnetic core and a solenoid wire connected to an alternating voltage source for creating an alternating magnetic field between the first and second magnetic poles.

12. The magneto-optical apparatus of claim 11, wherein the magnet is c-shaped with the first and second magnetic poles at distant ends.

13. The magneto-optical apparatus according to claim 11, wherein the alternating biasing means further enables induction of a steady state magnetic field superimposed on the alternating magnetic field.

14. The magneto-optical apparatus according to claim 11, wherein the alternating magnetic field induced by the alternating bias means is generated by an alternating current having a square waveform.

15. The magneto-optical apparatus according to claim 11, comprising means that enable information elements to be read at a determined frequency, the frequency of the alternating magnetic field being greater than the determined frequency.

16. The magneto-optical apparatus according to claim 15, wherein the frequency of the alternating magnetic field is an even multiple of said determined frequency.

17. The magneto-optical apparatus according to claim 10, wherein the magnetic film further comprises:

two layers of magnetic material separated by a gap layer made of non-magnetic material and includes a reading zone designed to be located in a magnetic field to be detected, the light beam being polarized and being reflected by one of magnetic layers, an analyzer of polarizations receiving the light beam that is read and transmitting the light beam to a photodetector.

18. The magneto-optical apparatus of claim 10, further comprising:

a DC biasing means coupled to the alternating biasing means for superimposing a DC magnetic field on the instantaneously uniform magnetic field to optimize the efficiency of the instantaneously uniform magnetic field.

* * * * *